Jan. 29, 1935.   H. L. JOHNSTON   1,989,138
FOOD HANDLING APPARATUS
Original Filed Jan. 23, 1930   3 Sheets-Sheet 1

INVENTOR
Herbert L. Johnston
BY Maréchal & Noé
ATTORNEY

Jan. 29, 1935.    H. L. JOHNSTON    1,989,138
FOOD HANDLING APPARATUS
Original Filed Jan. 23, 1930    3 Sheets-Sheet 2
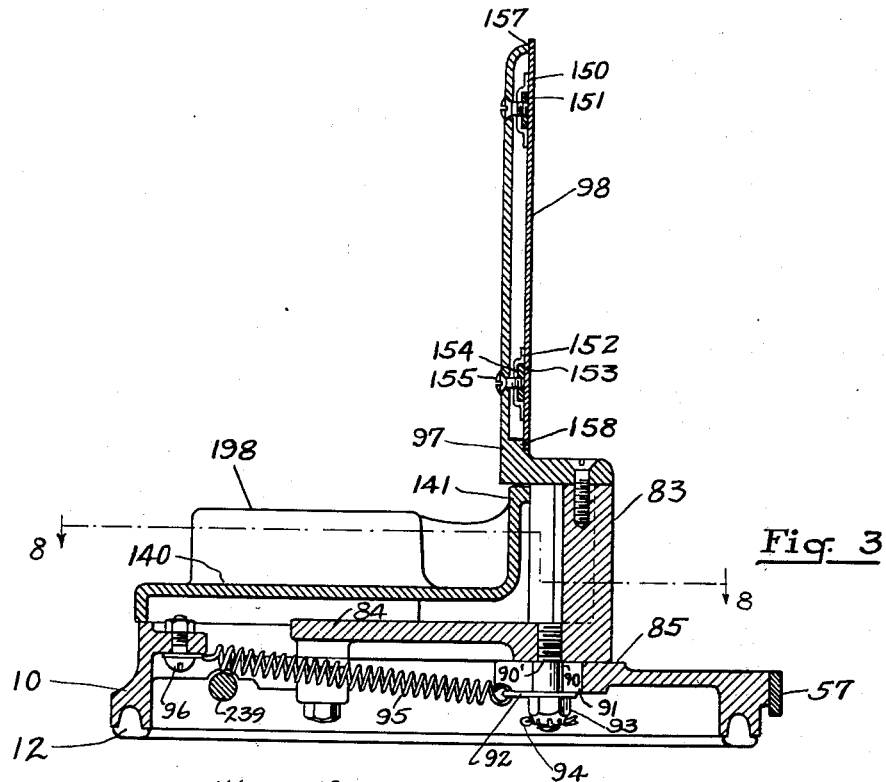
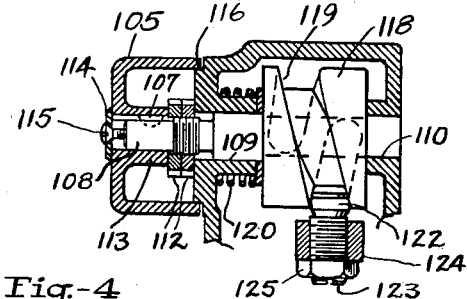
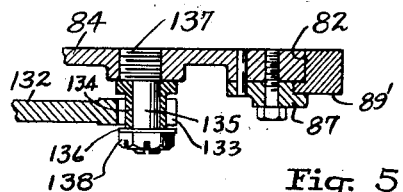
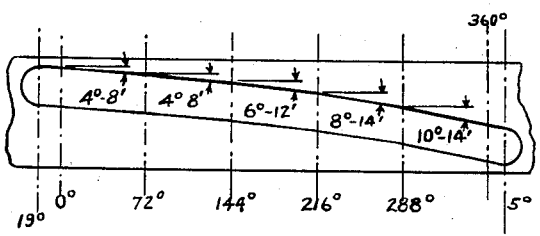
INVENTOR
Herbert L. Johnston
BY Maréchal & Noz
ATTORNEY Jan. 29, 1935. H. L. JOHNSTON 1,989,138
FOOD HANDLING APPARATUS
Original Filed Jan. 23, 1930   3 Sheets-Sheet 3

INVENTOR
Herbert L. Johnston
BY Marechal & Roe
ATTORNEY

Patented Jan. 29, 1935

1,989,138

UNITED STATES PATENT OFFICE 1,989,138

FOOD HANDLING APPARATUS

Herbert L. Johnston, Troy, Ohio, assignor to The Hobart Manufacturing Company, Troy, Ohio, a corporation of Ohio Original application January 23, 1930, Serial No. 422,746. Divided and this application May 27, 1931, Serial No. 540,279

30 Claims. (Cl. 146—102)

This invention relates to food handling apparatus, and more particularly to slicing machines.

One of the principal objects of the invention is to provide apparatus of this character which is simple in construction, is highly effective in operation, is sturdy and has long life, is sanitary and easily cleaned, and is safely and readily operated and controlled.

Another object of the invention is to provide a machine of this character with highly effective means for varying and controlling the thickness of the slices being cut.

Still another object of the invention is to provide a machine of this character having a base and gage plate mechanism constructed so as to be effectively sealed against the passage of grease and materials down through the same to the under side of the base and in which the base is provided with a flexible under supporting portion adapted to conform with the surface of the table or bench upon which the machine rests to prevent the ingress of grease and materials from the exterior to the under side of the base between the supporting surface and the flexible portion of the base, to thereby provide an unusually sanitary construction.

Other objects and advantages of the invention will be apparent from the following description, the accompanying drawings and the appended claims.

This is a division of my copending application Serial No. 422,746, filed January 23, 1930 for Food handling apparatus.

In the drawings in which like characters of reference are used to denote like parts throughout the several views thereof—

Fig. 3 is a vertical sectional view taken on the plane of the line 3—3 of Fig. 2, the pedestal, motor, gear casing, knife and related parts being removed;

Fig. 4 is a detail vertical sectional view taken on the plane of the line 4—4 of Fig. 2;

Figure 2:
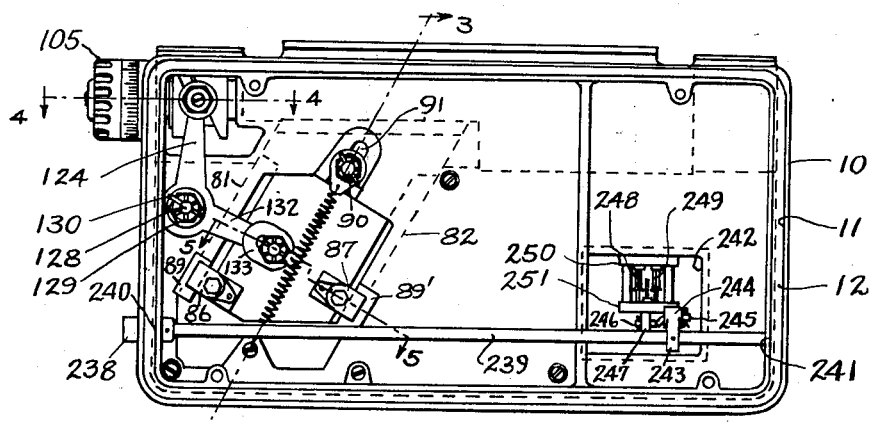
Fig. 2 is a bottom plan view of the machine looking upwardly upon the base.
Figure 6:
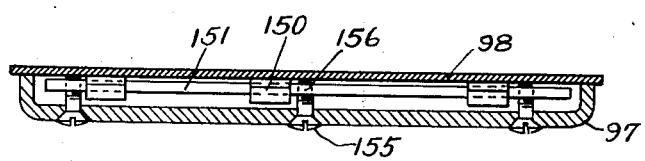
Figure 8:
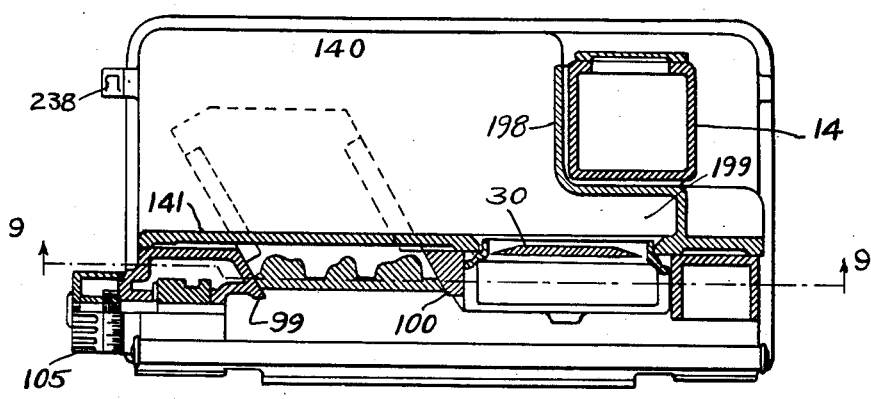
Figure 9:
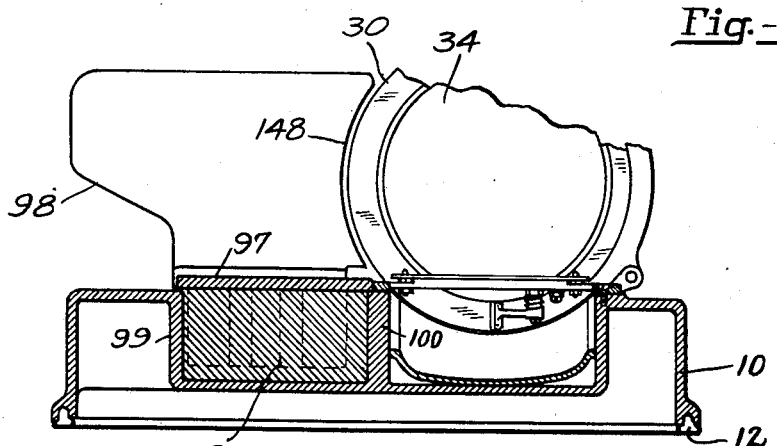
Figure 7:
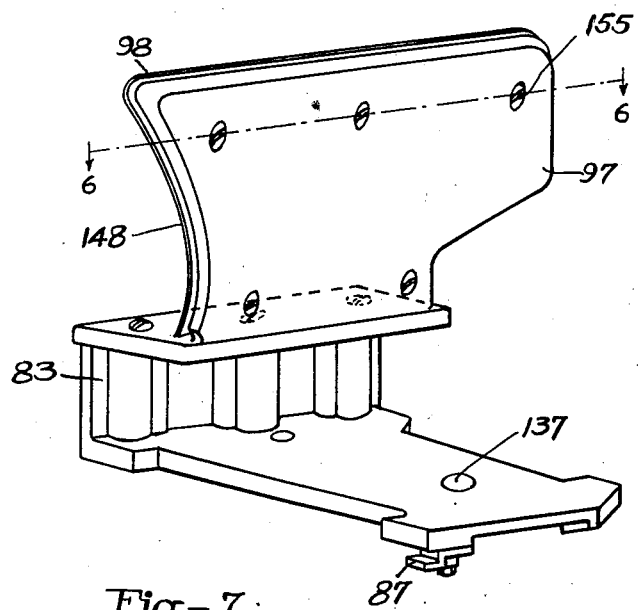

Fig. 4ª is a development of the cam groove shown in Fig. 4;

Fig. 5 is a detail sectional view taken on the plane of the line 5—5 of Fig. 2;

Fig. 6 is a detail sectional view taken on the plane of the line 6—6 of Fig. 7;

Fig. 7 is a perspective view of the gage plate and slide;

Fig. 8 is a horizontal sectional view taken on the plane of the broken line 8—8 of Fig. 3 with the carriage and related parts and the motor and gear casing and related parts removed; and Fig. 9 is a vertical sectional view of the parts shown in Fig. 8 taken on the plane of the line 9—9 of Fig. 8.

Referring to the drawings, in which is disclosed a preferred embodiment of the invention, the numeral 10 indicates the base of the machine which is illustrated as a casting, generally rectangular in shape and provided on the under side thereof with a peripheral groove 11 receiving a supporting rubber band or bead 12. The base 10 carries a raised portion or upwardly extending hollow rectangular projection 14 upon which is mounted an electric motor 15 and gear casing 16 containing interconnected shafts and gears (not shown) for supporting and driving the rotary disk knife 30. This knife may be of usual construction having a peripheral cutting edge, and a circular recess in the forward face to receive therein a guard plate 34.

Mounted upon upstanding hollow rectangular bosses 50 and 50' at opposite corners of the front side of base 10 is a cylindrical track 51. A lower track or guide rail 57 is suitably bolted or screwed to the front face of the base 10. These tracks support a carriage 52 for reciprocation across the front face of the knife. The carriage is arranged to receive the material to be sliced and includes a V-shaped trough having sides 60 and 61 arranged at substantially right angles to each other. Mounted on the carriage adjacent the upper portion of the side 61 is a rod 66, on which is pivotally mounted an arm 67 provided with forwardly extending spaced bearing lugs 43 and 44, in which is rotatably mounted a rod 45 connected to a pusher plate 71 adapted to operate within the V trough upon the foodstuffs therein for moving them on the trough toward the plane of the knife.

In order to regulate the thickness of the slices being cut, a gage plate is adjustably mounted in association with the rotary knife 30. As shown more particularly in Figs. 2 and 3, the base 10 is formed with spaced tracks 81 and 82 which are inclined to the plane of the knife. A portion of the base between these tracks is cut away. A member 83 having an integrally formed projection 84, is slidably supported on flat bearing surfaces between tracks 81 and 82 and upon a flat bearing portion 85 on the upper surface of the base 10. Bolted to the under side of slide 84 are spaced guide shoes 86 and 87 which overlap and ride on depending flat bearing pads 89 and 89' formed on the under surface of base 10 below tracks 81 and 82. A bolt 90 is threaded within the member 83, this bolt passing through a slot 91, formed in the base 10 as an extension of the opening in the base between the tracks. This bolt is formed with a limiting shoulder 90'. Surrounding the bolt 90 is a spring plate 92. This plate is positioned below the slot 91 and is held by the nut 93 in desired contact with the lower face of the base, to adjust and compensate for wear—to give a ready sliding contact. The nut 93 is held in adjusted position by a cotter key 94, the nut having a plurality of passages to permit of suitably fine adjustment. A spring 95 is connected at one end to the plate 92, and has its outer end connected to a fixed part of the base 10. As shown this spring is detachably connected to the base by means of the bolt 96. This spring is under suitable tension and urges the slidable member 83 towards the back of the base.

Bolted to the member or slide 83 is a gage supporting member or gage plate back 97 which carries the gage plate 98. Extending upwardly from the base, alongside the tracks 81 and 82, are guides 99 and 100 spaced and finished to receive and guide the slide member 83. The member 97 extends sideways to overlie the top surfaces of the guides 99—100 to cover the joints between the slide 83 and the guides 99—100.

A rotatable knurled adjusting wheel or handle 105, having suitable indicating lines 106 thereon cooperating with an indicating line formed on the base, is keyed at 107 to a shaft 108 rotatably mounted in suitable bearings 109 and 110 within box 50 of the base 10, an opening being provided in the base beneath box 50. Shaft 108 is threaded at its outer end and receives thereon threaded spacers or washers 112 interposed between the hub portion 113 of wheel 105 and the adjoining end of box 50. A retaining washer 114 and screw 115 retain the wheel on shaft 108. A forwardly extending circular flange 116 receives the cylindrical end of wheel 105. Mounted on shaft 108 for rotation therewith is a cam member 118 having a cam groove 119 formed therein. A spring 120 is interposed between the wall of base 10 and the cam member 118 to urge the shaft 108 and related parts to the right, as shown in Fig. 4, to thereby take up play in the adjusting mechanism.

Positioned within groove 119 is a cam follower 122 having a central cylindrical portion and tapered end portions, the follower being formed on the end of a screw 123 which is threadedly received within a bore in the end of one arm 124 of a bell crank lever, the screw being fastened in position by nut 125. The bell crank lever is pivotally mounted upon a bolt 128 depending from the under side of base 10, the bolt 128 being threaded at its lower end to receive a nut 129 secured in place by cotter key 130, to retain the lever in position. The other arm 132 of the bell crank lever is forked at its outer end 133 to receive (as shown more clearly in Fig. 5) a sleeve 134 mounted on a depending pin 135 eccentrically carried by a bolt 137 which is threaded into the slide extension 84. Sleeve 134 and forked arm 133 are retained in position by means of washer 136 and nut 138 threaded upon the outer threaded and slotted end of the pin 135. By turning the adjusting wheel 105, shaft 108 is rotated causing the cam slot 119 to move follower 122 correspondingly to rock the bell crank lever upon its pivot 128 and move member 83 along the tracks 81 and 82 to adjust the position of gage plate 98 relative to the vertical plane of the rotary knife 30.

As shown, the gage plate back 97 has its upper portion offset backward to provide an overhang. Positioned immediately behind the gage member is an enameled slice receiving tray 140, which has an upwardly extending side 141 proportioned to extend in under the overhang in spaced relation thereto. The gage plate back 97 and its associated gage plate 98 are thus securely and rigidly supported by means of the bearing slide, which has a horizontal bearing surface of considerable extent cooperating with the tracks 81 and 82 and bearing surface 85 on base 10, and vertical guiding surfaces cooperating with the vertical bearing surfaces 99 and 100; and desired range of adjustment of the gage plate is thus afforded while conserving space required for this adjusting movement by the construction in which the gage plate overhangs the slice receiving tray 140, and the slide moves beneath the tray 140.

As best shown in Fig. 2, the tracks 81 and 82 are arranged diagonally of the base frame, so that the slide and gage plate similarly follow a diagonal path with reference to the plane of the rotary knife. The end of the gage plate adjacent the knife is a curved edge to correspond to the shape of the edge of the rotary knife, as shown by the numeral 148 in Fig. 7. The arrangement is such that when the gage plate is at or near neutral or zero position, in which position it is lying substantially in the plane of the slicing edge of the knife, and therefore positioned to cut slices of minimum thickness, the edge 148 is most closely adjacent the edge of the slicing knife. However, as the gage plate is adjusted along the tracks to cut slices of increased thickness, the plate is also shifted laterally away from the knife edge so that the effective clearance between the edge 148 and the knife is at the same time correspondingly increased.

The cam groove 119 is formed with a variable lead which increases progressively from the left hand or outer end to the right hand or inner end, as shown in Fig. 4. The actual cutting of a groove of continuously variable lead is a difficult machining job, and in practice, it is easier to form this cam groove in a plurality of zones each of which is of substantially constant lead, but the succeeding zones (starting from the left hand or outer end of Fig. 4) are of progressively increasing lead. Fig. 4ᵃ is a development of such a variable zone groove, in which a plurality of zones are provided. As a result the degree of movement of the cam follower 122 for a given angular movement of wheel 105 progressively increases as the member 122 travels from the left hand end (which in the setting shown is the zero setting for slices of minimum thickness) to the right hand end (which as shown is the setting for slices of maximum thickness). By reason of this construction, the same angular movement of the control wheel 105 in different zones of the cam groove will cause the gage plate to move to a greater or lesser extent; for example, when it is in the setting for cutting thinner slices, it will move less than when it is in the setting for cutting thicker slices, and the effective lateral movement of the gage plate away from the edge of the knife is also varied correspondingly. The thinner the slices desired, the nicer the adjusting should be. The present arrangement secures this result, in a very simple manner, and gives in effect a highly sensitive or vernier adjustment for the setting, which facilitates accurate setting of the gage plate when very small differences in the thickness of slices is desired, such as when cutting very thin slices; without complicated and expensive mechanism. In addition, the effective movement of the gage plate rearwardly from the plane of the knife is also correspondingly variable and bears a constant ratio to the effective lateral movement of the gage plate in the plane of the knife. The resultant of these two movements—which is the actual or effective movement of the gage plate and which for purposes of easier description is herein termed the "absolute" movement of the gage plate—is a predetermined variable; and the amount of absolute movement varies in different zones of the cam groove for a given angular movement of the adjusting wheel 105. Starting, for example, with the adjusting wheel in the zero position, as adjustment is made for thicker slices, the effective rearward and lateral movements are at progressively increasing rates, but the rearward spacing and the lateral spacing are at all times maintained in a proper and constant proportion for efficient slicing operation. The diagonal inclination of the tracks 81 and 82 is coordinated with the varying pitch of the cam groove to give this proper proportioning, very satisfactory results being secured with the construction illustrated in the drawings in which the tracks are inclined at an angle of substantially sixty degrees and the cam groove varies from a pitch of substantially four degrees at the zero setting to a pitch of substantially ten degrees at the maximum setting.

In order to properly position the gage plate 98 with reference to the back support 97, an adjustable connection is provided between these parts. As shown, the gage plate 98 is formed with an upper row of rearwardly extending lugs 150 having aligned openings therein for loosely receiving a rectangular bar 151. A similar series of lugs 152 is provided at the lower side of the gage plate, these lugs having aligned openings 153 loosely receiving a rectangular bar 154. A plurality of screws 155 pass through the back support 97 and engage in threaded openings 156 within the bars 151 and 154. When the screws 155 are loosened, the gage plate 98 and lugs 150 and 152 may then be slid along the bars 151 and 154 to adjust the clearance of the edge 148 with reference to the cutting edge of the slicing knife. The screws are then drawn tight to rigidly hold the gage plate in adjusted position against the upper edge 157 and the lower seating shoulder 158 of the back support 97. To adjust the setting of the mechanism so that the zero position of the gage-plate corresponds to the zero setting of the wheel 105, the screw 137 upon loosening of nut 138 is rotated within the slide 84 to thereby shift the position of the eccentric pin 135 which is engaged by the forked end 133 of the bell crank lever. This shifts the slide 84 and gage plate 98 with reference to the bell crank lever and wheel 105.

Figure 1:
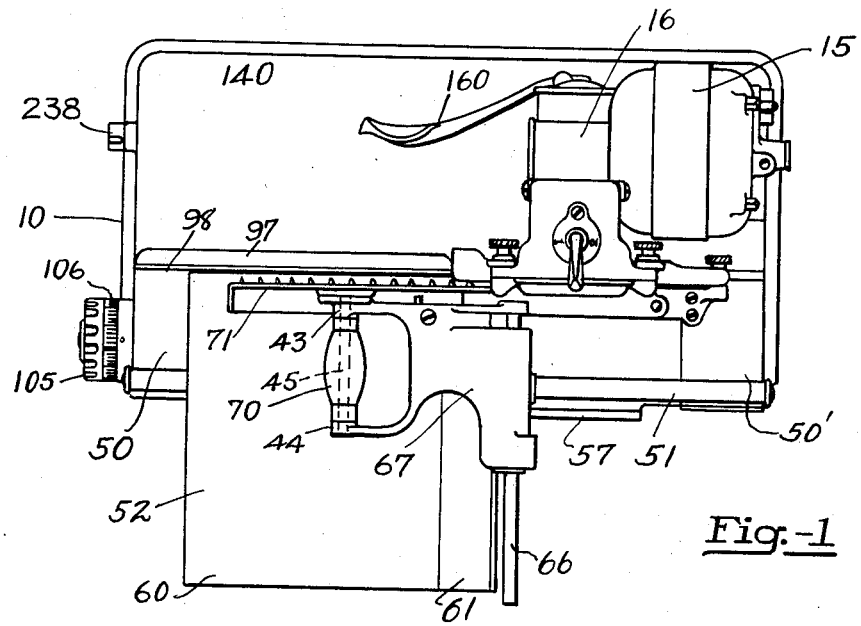
Fig. 1 is a plan view of a slicing machine constructed in accordance with this invention.

In the slicing operation, the meat or other material to be sliced is placed within the V-trough, and is pushed toward the gage plate 98 by means of the pusher plate 71 at the same time as the carriage is moved along the tracks 51 and 57 by the operator, grasping the handle 70, a slice being cut from the material by the rotary knife on each reciprocation of the carriage away from the operator, who stands at the left end of the machine as viewed in Fig. 1. To guide the slices away from the knife a deflector 160 is provided having an edge closely spaced with respect to the rear face of the knife in operative position of the deflector, and which is pivoted at the rear side of the gear casing 16 to swing away from the knife 30 to facilitate cleaning.

The enameled slice receiving tray 140 is provided with an upwardly extending flange portion 198 alongside the raised portion 14 of the base. The tray also has a reduced extension or neck 199 which extends between the portion 14 and the slicing knife 30. The flange 198 extends on around this neck and joins with a flange 141, extending adjacent the knife 30, thus providing a trough between the portion 14 and the knife. The slice tray 140 is thus provided with a peripheral enameled flange completely enclosing the side of the tray adjacent the operating parts, so that there are no grease and meat pockets, which are difficult to clean, and a sanitary easily cleaned structure is provided. For convenience in manufacture, the enameled slice receiving tray 140 and the flange 198 may be spaced somewhat from the raised portion 14 of the base, and this space then filled with a suitable plastic filling material, such as gypsum, which hardens to provide a smooth connection between the tray and raised portion with the elimination of grease collecting grooves or joints. The construction of the machine as shown and described provides a substantially imperforate upper exposed surface, so that grease or meat juices cannot penetrate into the interior of the base; and the resilient bead 12 resting upon the counter or other support for the machine prevents the ingress of such grease or meat juices from the exterior to hidden portions beneath the base,—to thus provide a structure sanitary and cleanly beyond that hitherto attained. The construction of the base 10, slice tray 140 and gage plate mechanism contributes to the impervious nature of the upper exposed surface of the slicing machine while at the same time facilitating cleaning of the parts. Thus the slice tray 140 overlies the base member and the slide 84 of the gage plate, while the gage plate 98 and supporting back 97 in turn overlie the upstanding flange 141 of the slice tray, and also overlie the upper guiding surfaces 99 and 100 formed on the base and which facilitate the guiding of the gage plate during its movement. The slide 84 is in turn mounted in a lubricant sealed sliding relationship with the lower guiding surface 85 formed on the base adjacent the forward portion thereof. The slice tray is thus not only sealed with respect to the upstanding pedestal or hollow projection 14 and the portions of the base with which the flange 141 cooperate, but the gage plate mechanism and related parts are so constructed as to effectively seal the openings provided for the slide 84, so that the upper exposed surface of the machine is substantially imperforate. The base is thus not only sealed against the ingress of grease or materials down through the same to the under side thereof, but is also effectively sealed about its peripheral edge to prevent the ingress of grease or materials from the exterior to the under side thereof between the supporting surface of the machine and its lower peripheral supporting edge. This is effectively accomplished by providing on the under side of the base a flexible supporting portion, in this instance shown as the continuous flexible bead 12, which is arranged to conform to any irregularities which may be present on the surface of the bench or table on which the machine is supported so as to effectively seal the periphery of the machine against ingress of materials thereunder.

In order to control the operation of the motor, a control member or lever 238 is rigidly fastened on the exterior of base 10 at the operator's end of the machine on a shaft 239 journaled in bearings 240 and 241 in the base 10 and extending beneath the base. Adjacent the other end of shaft 239 and beneath an opening 242 in the base 10 which is in alignment with the raised portion 14, the shaft 239 has pinned thereto a crank arm 243, to the outer end of which is pivotally connected by a socket and cotter pin connection 244 a link 245, which in turn is pivotally connected by a pin and socket connection 246 to a pivotally mounted contact lever 247 of a suitable electric switch which may be of conventional construction. As shown, the switch is a two pole switch having spaced spring contacts 248 and 249 supported by insulating plates 250 and 251, the arrangement being such that when the lever 238 is shifted to thereby shift the crank arm 243 and interconnections, the pivoted lever 247 carrying spring contacts is adapted to engage or disengage with the contacts 248 and 249 with a snap action to open or close the electric circuit of the motor 15. The lever 238 is thus positioned at the operator's end of the machine adjacent the adjusting knob 105 so that the control is centralized. The arrangement is such as to maintain the impervious nature of the base, while at the same time protecting the operating connections from injury and the ingress of grease and meat particles.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a slicing machine, a gage plate, means for adjusting the setting of said gage plate to control the thickness of the slices cut, and interconnections between said adjusting means and said gage plate, said interconnections including a variable movement mechanism for progressively decreasing absolute movement of said gage plate for a given movement of said adjusting means as said gage plate is moved toward positioning to cut thinner slices to thereby increase the sensitivity of said adjusting means.

2. In a slicing machine, a gage plate for controlling the thickness of the slices cut, a follower operatively connected thereto, a cam for actuating said follower, and means for operating said cam to effect varying positioning of said gage plate, the effective face of said cam being of varying pitch, increasing from a minimum at zero setting of said gage plate to a maximum at the setting of said gage plate for slices of maximum thickness.

3. In a slicing machine, a gage plate, a gage plate back, lugs carried on the rear of said gage plate having aligned openings therein, a bar movably mounted within said openings, and connections between said bar and said gage plate back.

4. In a slicing machine, a rotary slicing knife, a gage plate having a diagonal movement relative to the plane of said slicing knife, means for adjusting the setting of said gage plate to vary the thickness of slices, and interconnections between said adjusting means and said gage plate, said interconnections including a variable movement mechanism to progressively decrease the absolute movement of said gage plate for a given movement of said adjusting means as said gage plate is set to cut thinner slices to thereby increase the sensitivity of said adjusting means, the angular inclination of said diagonal movement being coordinated with said sensitivity increasing interconnections to maintain the rearward and lateral spacing of the adjacent edge of the gage plate from the cutting edge of the knife in a substantially constant proportion.

5. In a slicing machine, a rotary slicing knife, a gage plate having a diagonal movement relative to the plane of said slicing knife, a cam member having a cam groove therein, a follower operating within said cam groove, interconnections between said follower and said gage plate to adjust the position of said gage plate, said cam groove having a varying pitch increasing from a minimum at zero setting of said gage plate to a maximum at the setting of said gage plate for slices of maximum thickness, the varying pitch of said cam groove being coordinated with the angular inclination of the diagonal movement of said gage plate to thereby maintain the rearward and lateral spacing of the adjacent edge of said gage plate from the cutting edge of said knife in a substantially constant proportion.

6. In a slicing machine a gage plate, a slide connected to said gage plate, an adjusting shaft, a came member carried by said adjusting shaft and having a cam groove therein, a pivoted lever carrying a follower operating in said cam groove, and an eccentrically adjustable connection between said lever and said slide to vary the relative position of said slide for a given position of said adjusting shaft.

7. In a slicing machine, a rotary slicing knife, a gage plate having an imperforate front wall, a gage plate back, a plurality of lugs carried on the rear of said gage plate having horizontally aligned openings therein, a bar slidably received within said openings, and releasable connections between said bar and said gage plate back to provide adjustment of said gage plate with reference to said gage plate back in the plane of said rotary knife.

8. In a slicing machine, a substantially impervious base adapted to prevent passage of meat juices and particles from the upper side thereof through the base to the under side thereof, a gage plate, means extending through said base for supporting said gage plate, means associated with said supporting means for effecting sealing thereof to maintain the impervious character of the said base, and a flexible peripheral supporting portion extending around said base for supporting the machine on a receiving surface and adapted to conform to any irregularities in the receiving surface to form a seal preventing the ingress of juices and particles from the exterior of the machine to the under side of the base between the peripheral supporting portion and the receiving surface.

9. In a slicing machine, a base, a slice tray supported on said base, a gage plate mounted for adjusting movement on said base and arranged with respect to said base and slice tray so as to effectively seal against the ingress of grease and particles down through said base to the under side thereof, a hollow projection on said base, power means mounted on said projection, a rotary knife mounted on said projection and driven by said power means, sealing means between said slice tray and said projection to further maintain the impervious nature of the upper surface of said machine and to seal against the ingress of grease and particles down through said base to the under side thereof, a power control member for said power means arranged within said hollow projection, manual means on the exterior of the base for operating said power controlled member, and interconnections positioned beneath said base between said manual means and said power control member, the arrangement being such as to maintain the impervious character of the upper surface of the machine while arranging the said interconnections in protected position beneath the base.

10. In a slicing machine, a base, a gage plate, a slide supporting said gage plate, an upper guide surface on said base cooperating in sealing relationship with said gage plate, a lower guide surfce on said base cooperating in a lubricant sealed sliding fit with said slide, and a slice tray overlying said slide and underlying said gage plate, the construction being such as to provide a substantially impervious upper surface for said machine to thereby prevent the ingress of grease and particles down through the base to the under side thereof.

11. In a slicing machine having a rotary knife, and a carriage adapted to support an article to be sliced and mounted for movement across the face of said knife; a base, a slice receiving tray mounted on said base at the rear side of said knife, a gage plate mounted on said base in cooperative relationship with said carriage to control the thickness of slices being cut from the article supported on the carriage, a slide connected to said gage plate and stabilizing the movement thereof, said slide being mounted in lubricant sealed sliding relationship along said base to close and seal a portion of the opening in said base receiving said slide against the ingress of meat particles and impurities and having a projecting portion overhanging said slice receiving tray, said slice receiving tray having a portion overlying the slide and closing the balance of the said opening in said base.

12. In a slicing machine having a rotary knife, and a carriage adapted to support an article to be sliced and mounted for movement across the face of said knife; a base, a flat slice receiving tray mounted on said base at the rear side of said knife, and extending substantially to the front end of the machine, a gage plate extending above said slice tray and mounted in cooperative relationship with said carriage to control the thickness of slices being cut from the article supported on said carriage, a long weighted slide connected to said gage plate to stabilize the movement thereof and extending rearwardly therefrom, said slice tray being spaced from the base adjacent the connection of said slide to said gage plate and providing an opening receiving said slide for movement beneath the said slice tray.

13. In a slicing machine having a rotary knife, and a carriage adapted to support an article to be sliced and mounted for movement across the face of said knife; a base having an upstanding portion with a slide receiving opening therein, a slice tray mounted on said base at the rear side of said upstanding portion and having an upstanding flange in sealing relation with said upstanding portion of the base, said flange extending across said slide receiving opening, a gage plate mounted in cooperative relationship with said carriage to control the thickness of slices being cut from the article supported on said carriage, and a gage plate slide connected to said gage plate and mounted beneath said slice receiving tray and in lubricant sealed sliding relationship on said base within said slide receiving opening.

14. In a slicing machine having a rotary knife, and a carriage adapted to support an article to be sliced and mounted for movement across the face of said knife; a base having an upstanding portion with a slide receiving opening therein, a slice tray mounted on said base at the rear side of said upstanding portion and having an upstanding flange in sealing relation with said upstanding portion of the base, said flange extending across said slide receiving opening, a gage plate mounted in cooperative relationship with said carriage to control the thickness of slices being cut from the article supported on said carriage, and a gage plate slide connected to said gage plate and mounted beneath said slice receiving tray and in lubricant sealed sliding relationship on said base within said slide receiving opening, said gage plate overlying the said upstanding portion of said base about said slide receiving opening and also overlying the said slice tray flange to further seal the parts against the ingress of meat particles and impurities.

15. In a slicing machine having a rotary knife, and a carriage adapted to support an article to be sliced and mounted for movement across the face of said knife; a base having an upstanding portion with a diagonally arranged slide receiving opening therein, a gage plate mounted in cooperative relationship with said carriage to control the thickness of slices being cut from the article supported on said carriage, a gage plate slide connected to said gage plate and mounted in lubricant sealed sliding relationship on said base and in lubricant sealed sliding relationship with the slides of said diagonally arranged slide receiving opening, said slide having an elongated extension protruding rearwardly therefrom beneath said slice receiving tray and to stabilize the movement of said gage plate, and track means on said base receiving and guiding said elongated extension.

16. In a slicing machine having a rotary knife, and a carriage adapted to support an article to be sliced and mounted for movement across the face of said knife; a base having an upstanding portion with a diagonally arranged slide receiving opening therein, a gage plate mounted in cooperative relationship with said carriage to control the thickness of slices being cut from the article supported on said carriage, a gage plate slide connected to said gage plate and mounted in lubricant sealed sliding relationship on said base and in lubricant sealed sliding relationship with the sides of said diagonally arranged slide receiving opening, said slide having an elongated extension protruding rearwardly therefrom to stabilize the movement of said gage plate, and a slice receiving tray mounted on said base and space therefrom to provide an opening receiving said elongated extension beneath the said slice receiving tray.

17. In a slicing machine having a rotary knife, and a carriage adapted to support an article to be sliced and mounted for movement across the face of said knife; a base, a slice receiving tray mounted on said base at the rear side of said knife, and extending substantially to the front end of said machine, a gage plate mounted in cooperative relationship with said carriage to control the thickness of slices being cut from the article supported on said carriage, an adjustable support for said gage plate on said base underlying said slice receiving tray for movement of the gage plate toward and away from the plane of the cutting edge of said knife, said gage plate being positioned opposite the forward end of said slice tray and overlying the slice tray in the range of its adjusting movement, and a connection between said support and said gage plate extending from the said support beyond the front side of said slice receiving tray, whereby a substantial slice accumulating surface extending substantially to the front end of said machine is provided on said slice tray, the said surface being unbroken by said connection from the said support to said gage plate.

18. In a slicing machine having a rotary knife, and a carriage adapted to support an article to be sliced and mounted for movement across the face of said knife; a base, a slice receiving tray mounted on said base at the rear side of said knife, a gage plate mounted in cooperative relationship with said carriage to control the thickness of slices being cut from the article supported on the carriage, an adjustable support for said gage plate on said base underlying said slice receiving tray for movement of the gage plate toward and away from the plane of the cutting edge of said knife, said slice tray having an upstanding flange at the front side thereof, said gage plate overlying said upstanding flange of the slice tray in the range of its adjusting movement, and a connection between said support and said gage plate extending from the support beyond the said upstanding flange of the slice tray, whereby the surfaces of said tray and upstanding flange are continuous and unbroken by said connection.

19. In a slicing machine having a base carrying an upstanding projection supporting a rotary knife, and a carriage adapted to support an article to be sliced and mounted for movement across the face of said knife; a slice receiving tray mounted on said base at the rear side of said knife and extending substantially to the front end of said machine, a gage plate mounted adjacent the front side of said slice tray in cooperative relationship with said carriage to control the thickness of slices being cut from the article supported on the carriage, an upstanding flange on the slice tray extending along the rear end of the tray adjacent the said upstanding projection supporting the knife and thence along the front side of the slice tray to the front end thereof, said gage plate overlying said flange in the range of its adjusting movement, an adjustable support for said gage plate on said base underlying said slice tray for movement of the gage plate toward and away from the plane of the cutting edge of said knife, and a connection between said support and said gage plate extending from the said support beyond the upstanding flange at the front side of said slice tray, whereby the surfaces of said slice tray and flange are unbroken by said connection.

20. In a slicing machine having a rotary knife, a gage plate, a slide connected to said gage plate, an adjusting shaft, interconnections between said adjusting shaft and said slide for moving said gage plate toward and away from the cutting plane of said knife, and eccentric means included in said interconnections for adjusting said interconnections to vary the effective operative positioning of said slide with reference to said adjusting shaft to effect a predetermined setting of said gage plate in relation to the cutting plane of said knife for a given setting of said adjusting shaft.

21. In a slicing machine, a base, a slice receiving tray mounted on said base, a gage plate, means for guiding said gage plate, slide means associated with said gage plate and slidably supported by said base beneath said slice receiving tray, an adjusting member for said gage plate, interconnections between said adjusting member and said slide means, said interconnections being positioned beneath said slice receiving tray, and said gage plate carrying means having a projecting portion offset to overhang said slice receiving tray.

22. In a slicing machine, a base, a slice receiving tray mounted on said base, spaced diagonally arranged track means on said base beneath said slice tray, slide means slidably supported by said diagonal track means and movable beneath said slice receiving tray, said track and slide means having cooperating bearing portions to prevent tilting movement of said gage plate in either direction, said slice receiving tray having an upwardly extending flange, and a gage plate connected to said slide, the said gage plate and slide means having a projecting portion offset to overlie said flange and the space between said slide and slice tray flange.

23. In a slicing machine, a base, a slice receiving tray mounted on said base, spaced diagonally arranged track means carried by said base beneath said slice tray, slide means slidably supported by said diagonal track means and movable beneath said slice receiving tray, a gage plate supported by said slide means and positioned above said slice receiving tray, the said slide means and diagonally arranged track means having cooperating provisions to resist tilting movement of said gage plate in either direction.

24. In a slicing machine, a base, a slice receiving tray mounted on said base, spaced diagonally arranged track means carried by said base beneath said slice tray, slide means slidably supported by said diagonal track means and movable beneath said slice receiving tray, a gage plate supported by said slide means and positioned above said slice receiving tray, said slide means having means thereon for receiving each of said tracks in straddled sliding relation to prevent tilting movement of said gage plate in either direction.

25. In a slicing machine, a base, a rotary knife and motor operating means therefor supported on said base, a carriage for receiving material to be sliced, track means on said base supporting said carriage for cutting movement across said knife, a slice receiving tray supported on said base, a gage plate overlying said base and movable toward and away from the cutting plane of said knife, supporting and operating mechanism for moving said gage plate positioned below said slice tray; said base, and the knife track and other supporting and operating mechanisms being constructed to provide a substantially impervious upper surface to prevent the passage of grease and extraneous particles down through the base to the under side thereof; said base having a flexible supporting portion around its periphery adapted to rest upon and conform to irregularities in the supporting surface upon which the machine rests, to thus provide a sealing of the base preventing the passage of grease and extraneous particles from the exterior of the machine down through and underneath the said base to the space thereunder to prevent contamination within said space.

26. In a slicing machine having a rotary knife, a base, a slice receiving tray mounted on said base, a gage plate, a mounting for said gage plate on said base for adjusting said gage plate toward and away from the plane of the cutting edge of the knife, said mounting underlying said slice receiving tray and extending out through an opening in the base but beneath the slice receiving tray at the front side thereof for connection to said gage plate mechanism, and means overhanging said mounting means and for protecting the opening through which said mounting means extends.

27. In a slicing machine having a rotary knife, a gage plate having an unbroken surface, a gage plate back member supporting said gage plate to provide a housing space, relatively movable adjusting members housed within said space between said gage plate and said back member to permit adjustment of said gage plate with respect to the cutting arc of said knife, and locking means effective upon the said interposed adjusting means to lock said gage plate in predetermined adjusted position; whereby the said gage plate may be readily adjusted, but maintained in sealed relationship with the supporting member and adjusting and locking means.

28. A slicing machine which includes a base, a knife mounted on said base, and means for actuating it, a work support, and means for guiding it across the face of the knife, and a gauge plate positioned in general parallelism with the path of movement of the work support, supporting means for said gauge plate including an upstanding housing, said housing including a rear wall and side walls extending forwardly from the rear wall, the housing having a forward opening adapted to be closed by the gauge plate, and securing means for the gauge plate, positioned within the housing, and operable through the rear wall of said housing, the gauge plate being spaced forwardly from the rear wall, the securing means being positioned in the space between the front face of the rear wall and the rear face of the gauge plate.

29. In a slicing machine which includes a base, a knife mounted on said base and means for actuating it, and a gauge plate, a slice receiving tray positioned to the rear of knife and gauge plate, a support for said gauge plate and means for moving it toward and away from the cutting plane of the knife, said gauge plate support including a generally horizontal closure member adapted to overlie an edge of said tray at all positions of adjustment of the gauge plate and to prevent penetration of material therebetween.

30. In a slicing machine which includes a base, a knife mounted on said base and means for actuating it, and a gauge plate, a slice receiving tray positioned to the rear of knife and gauge plate, a support for said gauge plate and means for moving it forward and away from the cutting plane of the knife, said gauge plate support being rearwardly recessed and including a horizontal closure member adapted to overlie an edge of said tray at all positions of adjustment of the gauge plate, the opposed parts of gauge plate support and tray being at all times closely adjacent the recessed portion of the horizontal closure member being opposed to an edge of the slice receiving tray and including a portion adapted to overhang and override the edge of the tray when the gauge plate support is rearwardly moved.

HERBERT L. JOHNSTON.